(12) United States Patent
Terpstra et al.

(10) Patent No.: US 9,998,526 B2
(45) Date of Patent: *Jun. 12, 2018

(54) REGISTRATION REDIRECT SERVER

(71) Applicant: LEVEL 3 COMMUNICATIONS, LLC, Broomfield, CO (US)

(72) Inventors: Richard D. Terpstra, Superior, CO (US); John Hearty, Golden, CO (US); Daryl William Malas, Broomfield, CO (US)

(73) Assignee: Level 3 Communications, LLC, Broomfield, CO (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 14/804,257

(22) Filed: Jul. 20, 2015

(65) Prior Publication Data
US 2016/0021176 A1 Jan. 21, 2016

Related U.S. Application Data

(62) Division of application No. 13/336,813, filed on Dec. 23, 2011, now Pat. No. 9,088,599, which is a division of application No. 11/027,564, filed on Dec. 31, 2004, now Pat. No. 8,089,972.

(Continued)

(51) Int. Cl.
*H04L 29/08* (2006.01)
*H04L 29/06* (2006.01)

(52) U.S. Cl.
CPC ...... *H04L 67/1004* (2013.01); *H04L 65/1073* (2013.01); *H04L 67/1002* (2013.01);
(Continued)

(58) Field of Classification Search
None
See application file for complete search history.

(56) References Cited

U.S. PATENT DOCUMENTS

| 5,742,666 A | 4/1998 | Alpert |
| 5,774,668 A | 6/1998 | Choquier et al. |

(Continued)

FOREIGN PATENT DOCUMENTS

| EP | 1307018 A1 | 5/2003 |
| JP | 10307783 A1 | 11/1998 |

(Continued)

OTHER PUBLICATIONS

Cisco DistributedDirector, Cisco Systems, Inc. 1996, 9 pgs.

(Continued)

*Primary Examiner* — Steven H Nguyen

(57) ABSTRACT

Systems and methods for dynamically registering a communication device are disclosed. As one example, a communication network architecture is disclosed that includes multiple feature servers, multiple registration redirect servers (RRSs), and multiple communication devices. The feature servers provide services to the communication devices. The RRSs each service a shared virtual Internet Protocol (IP) address and perform load balancing of registration requests on behalf of multiple feature servers located geographically proximate to the RRS. The communication devices are configured to issue initial registration requests intended for any of the feature servers to the shared virtual IP address, whereby upon issuing an initial registration request, a communication device is directed to a particular feature server that is associated with a RRS that is closest to the communication device, and where the particular feature server is selected by a load balancing routine executing on the RRS.

16 Claims, 11 Drawing Sheets

Related U.S. Application Data

(60) Provisional application No. 60/567,542, filed on May 3, 2004.

(52) U.S. Cl.
CPC ............ *H04L 67/14* (2013.01); *H04L 67/141* (2013.01); *H04L 67/2814* (2013.01)

(56) References Cited

U.S. PATENT DOCUMENTS

| | | |
|---|---|---|
| 5,812,769 A | 9/1998 | Graber et al. |
| 5,819,092 A | 10/1998 | Ferguson et al. |
| 5,920,701 A | 7/1999 | Miller et al. |
| 5,956,716 A | 9/1999 | Kenner et al. |
| 6,052,718 A | 4/2000 | Gifford |
| 6,078,943 A | 6/2000 | Yu |
| 6,081,835 A | 6/2000 | Antcliff |
| 6,108,703 A | 8/2000 | Leighton et al. |
| 6,112,239 A | 8/2000 | Kenner et al. |
| 6,138,026 A | 10/2000 | Irvin |
| 6,154,744 A | 11/2000 | Kenner et al. |
| 6,167,427 A | 12/2000 | Rabinovich et al. |
| 6,175,869 B1 | 1/2001 | Ahuja et al. |
| 6,178,160 B1 | 1/2001 | Bolton et al. |
| 6,185,601 B1 | 2/2001 | Wolff |
| 6,185,619 B1 | 2/2001 | Joffe et al. |
| 6,243,760 B1 | 6/2001 | Armbruster et al. |
| 6,314,465 B1 | 11/2001 | Paul et al. |
| 6,330,605 B1 | 12/2001 | Christensen et al. |
| 6,374,299 B1 | 4/2002 | Ford et al. |
| 6,412,002 B1 | 6/2002 | Denman et al. |
| 6,412,004 B1 | 6/2002 | Chen et al. |
| 6,438,652 B1 | 8/2002 | Jordan et al. |
| 6,484,204 B1 | 11/2002 | Rabinovich |
| 6,574,612 B1 | 6/2003 | Baratti et al. |
| 6,601,084 B1 | 7/2003 | Bhaskaran et al. |
| 6,606,643 B1 | 8/2003 | Emens et al. |
| 6,636,499 B1 | 10/2003 | Dowling |
| 6,665,702 B1 | 12/2003 | Zisapel et al. |
| 6,678,357 B2 | 1/2004 | Stumer et al. |
| 6,687,731 B1 | 2/2004 | Kavak |
| 6,722,211 B1 | 4/2004 | Ciobanu et al. |
| 6,757,266 B1 * | 6/2004 | Hundscheidt ....... H04L 12/2856 370/328 |
| 6,760,775 B1 * | 7/2004 | Anerousis ............... H04L 29/06 709/229 |
| 6,778,496 B1 | 8/2004 | Meempat et al. |
| 6,795,858 B1 | 9/2004 | Jain et al. |
| 6,845,092 B2 | 1/2005 | Vassilovski et al. |
| 6,857,021 B1 | 2/2005 | Schuster et al. |
| 6,886,035 B2 | 4/2005 | Wolff |
| 6,938,031 B1 | 8/2005 | Zoltan et al. |
| 6,963,557 B2 | 11/2005 | Knox |
| 7,000,016 B1 | 2/2006 | Vanderbeck et al. |
| 7,031,728 B2 | 4/2006 | Beyer, Jr. |
| 7,076,541 B1 | 7/2006 | Burstein et al. |
| 7,088,718 B1 | 8/2006 | Srivastava |
| 7,103,645 B2 | 9/2006 | Leighton et al. |
| 7,103,647 B2 | 9/2006 | Aziz |
| 7,110,393 B1 | 9/2006 | Tripathi et al. |
| 7,111,052 B1 | 9/2006 | Cook |
| 7,136,651 B2 | 11/2006 | Kalavade |
| 7,151,753 B2 | 12/2006 | Chaney |
| 7,177,399 B2 | 2/2007 | Dawson et al. |
| 7,194,552 B1 | 3/2007 | Schneider |
| 7,248,891 B2 * | 7/2007 | Charles ................... H04L 63/12 370/355 |
| 7,292,853 B2 | 11/2007 | Nam et al. |
| 7,308,481 B2 | 12/2007 | Takamoto et al. |
| 7,328,281 B2 | 2/2008 | Takeda et al. |
| 7,333,459 B2 | 2/2008 | Feyerabend et al. |
| 7,342,928 B2 | 3/2008 | Boulay et al. |
| 7,379,458 B2 | 5/2008 | Inoue et al. |
| 7,412,521 B2 | 8/2008 | Olson et al. |
| 7,734,019 B1 | 6/2010 | Terpstra |
| 8,089,972 B2 * | 1/2012 | Terpstra ............... H04L 67/1004 370/401 |
| 8,768,350 B2 | 7/2014 | Hagens et al. |
| 9,088,599 B2 * | 7/2015 | Terpstra ............... H04L 67/1004 |
| 2001/0042139 A1 | 11/2001 | Jeffords et al. |
| 2002/0031107 A1 | 3/2002 | Li |
| 2002/0032777 A1 | 3/2002 | Kawata et al. |
| 2002/0078209 A1 | 6/2002 | Peng |
| 2002/0078263 A1 | 6/2002 | Darling et al. |
| 2002/0141401 A1 | 10/2002 | Albert et al. |
| 2002/0166117 A1 | 11/2002 | Abrams et al. |
| 2002/0194335 A1 | 12/2002 | Maynard |
| 2002/0194342 A1 | 12/2002 | Lu et al. |
| 2003/0007622 A1 | 1/2003 | Kalmanek |
| 2003/0009959 A1 | 1/2003 | Ikeda |
| 2003/0012344 A1 | 1/2003 | Agarwal et al. |
| 2003/0041238 A1 | 2/2003 | French et al. |
| 2003/0050051 A1 | 3/2003 | Vilander |
| 2003/0065761 A1 | 4/2003 | Cereja et al. |
| 2003/0105865 A1 | 6/2003 | McCanne et al. |
| 2003/0108000 A1 | 6/2003 | Chaney et al. |
| 2003/0110257 A1 | 6/2003 | Hyun et al. |
| 2003/0118011 A1 * | 6/2003 | Wu ................... H04L 29/06027 370/356 |
| 2003/0156577 A1 | 8/2003 | Dunlap et al. |
| 2003/0195001 A1 | 10/2003 | Tari et al. |
| 2004/0003084 A1 | 1/2004 | Malik |
| 2004/0095938 A1 * | 5/2004 | Ryu ................... H04L 29/06027 370/392 |
| 2004/0143662 A1 | 7/2004 | Poyhonen et al. |
| 2004/0152469 A1 | 8/2004 | Yla-Outinen et al. |
| 2004/0153525 A1 * | 8/2004 | Borella ................... H04L 29/06 709/217 |
| 2004/0160947 A1 | 8/2004 | Hardy et al. |
| 2004/0190497 A1 | 9/2004 | Knox |
| 2004/0205192 A1 * | 10/2004 | Olson ............... H04L 29/06027 709/227 |
| 2004/0264481 A1 | 12/2004 | Darling et al. |
| 2005/0010653 A1 * | 1/2005 | McCanne ............. H04L 69/329 709/219 |
| 2005/0022203 A1 | 1/2005 | Zisapel et al. |
| 2005/0044141 A1 | 2/2005 | Hameleers et al. |
| 2005/0055435 A1 | 3/2005 | Gbadegesin et al. |
| 2005/0085257 A1 | 4/2005 | Laird et al. |
| 2005/0091407 A1 | 4/2005 | Vaziri et al. |
| 2005/0101327 A1 | 5/2005 | Nam et al. |
| 2005/0136925 A1 | 6/2005 | Yamauchi |
| 2005/0169438 A1 | 8/2005 | Binning |
| 2005/0197767 A1 | 9/2005 | Nortrup |
| 2005/0213716 A1 | 9/2005 | Zhu et al. |
| 2005/0233728 A1 | 10/2005 | Karaoguz et al. |
| 2006/0013147 A1 | 1/2006 | Terpstra et al. |
| 2006/0056388 A1 | 3/2006 | Livingood |
| 2006/0064478 A1 | 3/2006 | Sirkin |
| 2006/0069776 A1 | 3/2006 | Shim et al. |
| 2006/0112170 A1 | 5/2006 | Sirkin |
| 2006/0235980 A1 | 10/2006 | Pote et al. |
| 2006/0265467 A1 | 11/2006 | Jang |
| 2007/0254625 A1 | 11/2007 | Edge |
| 2009/0070406 A1 | 3/2009 | Terpstra et al. |
| 2010/0248683 A1 | 9/2010 | Terpstra |
| 2012/0243466 A1 | 9/2012 | Hagens |
| 2013/0060941 A1 | 3/2013 | Terpstra et al. |
| 2015/0156320 A1 | 6/2015 | Hagens et al. |

FOREIGN PATENT DOCUMENTS

| | | |
|---|---|---|
| WO | WO-199857275 A3 | 12/1998 |
| WO | WO-199940514 A1 | 8/1999 |
| WO | WO-2001/52497 A2 | 7/2001 |
| WO | WO-2003105439 A1 | 12/2003 |

OTHER PUBLICATIONS

European Examination Report, dated Sep. 19, 2012, Application No. 05744499.4, 5 pgs.

(56) References Cited

OTHER PUBLICATIONS

European Search Report dated May 17, 2011, counterpart European Application No. 05744499.4, 5 pgs.
European Supplementary Search Report dated Feb. 2, 2011 counterpart European Application No. 05744499.4, 4 pgs.
Extended European Search Report, dated Sep. 24, 2013, Application No. 06717386.4 filed Jan. 3, 2006; 6 pgs.
International Searching Authority, U.S. Patent and Trademark Office and Receiving Office, International Search Report (Form PCT/ISAI210) for international application No. PCT/US05/15260 dated Oct. 27, 2005 , 3 pgs.
International Searching Authority, US Patent and Trademark Office and Receiving Office, Written Opinion of the International Searching Authority (Form PCT/ISA/237) for international application No. PCT/US05/15260 dated Oct. 27, 2005 , 3 pgs.
Terpstra, U.S. Appl. No. 14/698,707, filed Apr. 28, 2015, "Systems and Methods for Third Party Emergency Call Termination".
"NAT Traversal and VoIP: The Challenge to Peer-to-Peer Internel Communication", retrieved at hltp'//msdn.microsoft.com/en-us/librarylbb330896 (Printer) aspxon Jul. 8, 2008 Microsoft Corporation Mar. 24, 2008 , 11.
Almeroth, K. et al., "Scalable Delivery of Web Pages Using Cyclic Best-Effort (UDP) Multicast", *IEEE INFOCOM* San Francisco, California, USA Jun. 1998 , pp. 1-24.
Baentsch, M. et al., "Introducing Application-Level Replication and Naming into Today's Web", *Computer Networks and ISDN Systems* vol. 28, Nos. 7-11 May 1996 , pp. 921-930.
Berners-Lee, T. et al., RFC 1738—Uniform Resource Locators Dec. 1994 , pp. 1-25.
Berners-Lee, T. et al., "Hypertext Markup Language—2.0", Internet Engineering Task Force (IETF) Request for Comments (RFC) 1866 Nov. 1995 , pp. 1-77.
Berners-Lee, T. et al., "Hypertext Transfer Protocol—HTTP/1.0", Internet Engineering Task Force (IETF) Request for Comments (RFC) 1945 May 1996 , pp. 1-60.
Berners-Lee, T. et al., "Hypertext Transfer Protocol—HTTP/1.0", Internet Engineering Task Force (IETF), Internet Draft, draft-ietf-http-v10-spec-00.ps Mar. 1995 , pp. 1-59.
Berners-Lee, T. , "Univeral Resource Identifiers in WWW: A Unifying Syntax for the Expression of Names and Addresses of Objects on the Network as Used in the World-Wide Web", *Internet Engineering Task Force (IETF) Request for Comments (RFC)* 1630 Jun. 1994 , pp. 1-28.
Bestavros, A. , "Demand-Based Document Dissemination to Reduce Traffic and Balance Load in Distributed Information Systems", In Proc. IEEE Symp. on Parallel and Distributed Processing, San Antonio, TX Oct. 1995 , 8 pgs.
Bhattacharjee, S. et al., "Application-Layer Anycasting", *in Proc. IEEE INFOCOM '97* Apr. 1997 , 9 pgs.
Brisco, T. , "DNS Support for Load Balancing", IETF RFC 1794 Apr. 1995 , pp. 1-7.
Callon, R. , "Use of OSI IS-IS for Routing in TCP/IP and Dual Environments", *Internet Engineering Task Force (IETF) Request for Comments (RFC)* 1195 Dec. 1990 , pp. 1-85.
Chandra, R. et al., "BGP Communities Attribute", *Internet Engineering Task Force (IETF) Request for Comments (RFC)* 1997 Aug. 1996 , pp. 1-5.
Chen, E. et al., "An Application of the BGP Community Attribute in Multi-home Routing", *Internet Engineering Task Force (IETF) Request for Comments (RFC)* 1998 Aug. 1996 , pp. 1-9.

Colajanni, M. et al., "Scheduling Algorithms for Distributed Web Servers", Intl Conf. on Distributed Computing Systems (ICDCS), Baltimore, Maryland, USA May 1997 , pp. 169-176.
Collins, A. , "The Detour Framework for packet Rerouting", University of Washington; http://web.archive.org/web/19990202122310/http://www.cs/washington.edu/research/networking/detour/ Oct. 29, 1998 , pp. 1-20.
Eriksson, H. , "MBONE: The Multicast Backbone", *Communications of the ACM* vol. 37, No. 8 Aug. 1994 , pp. 54-60.
Fielding, R. et al., "Hypertext Transfer Protocol—HTTP/1.1", Internet Engineering Task Force (IETF) Internet Draft, draft-ietf-http-v11-spec-00.txt Nov. 1995 , pp. 1-81.
Fielding, R. et al., "Hypertext Transfer Protocol—HTTP/1.1", Internet Engineering Task Force (IETF) Request for Comments (RFC) 2068 Jan. 1997 , pp. 1-162.
Malkin, G. , "RIP Version 2 Carrying Additional Information", Internet Engineering Task Force (IETF) Request for Comments (RFC) 1388 Jan. 1993 , pp. 1-7.
Mockapetris, P. , "Domain Names—Concepts and Facilities", IETF RFC 1034 Nov. 1987 , 55 pgs.
Mockapetris, P. , "Domain Names—Implementation and Specification", IETF RFC 1035 Nov. 1987 , 55 pgs.
Moy, J. , "OSPF Version 2", Internet Engineering Task Force (IETF) Request for Comments (RFC) 1583 Mar. 1994 , 132 pgs.
Parris, C. et al., "A Dynamic Connection Management Scheme for Guaranteed Performance Services in Packet-Switching Integrated Services Networks", UC Berkeley Computer Science Division Tech. Report TR-93-005 1993 , 37 pgs.
Partridge, C. et al., "Host Anycasting Service", Internet Engineering Task Force (IETF) Request for Comments (RFC) 1546 Nov. 1993 , pp. 1-9.
Rekhter, Y. et al., "A Border Gateway Protocol 4 (BGP-4)", *Internet Engineering Task Force (IETF) Request for Comments (RFC)* 1771 Mar. 1995 , pp. 1-57.
Rekhter, Y. et al., "Application of the Border Gateway Protocol in the Internet", *Internet Engineering Task Force (IETF) Request for Comments (RFC)* 1772 Mar. 1995 , pp. 1-19.
Savage, S. et al., "Detour: Informed Internet Routing and Transport", *IEEE Micro* vol. 19, No. 1 Jan.-Feb. 1999 , pp. 1-10.
Schemers, R. , "Ibnamed: A Load Balancing Name Server in Perl", 1995 *Lisa IX* Monterey, California Sep. 1995 , pp. 1-12.
Topolcic, C. , "Experimental Internet Stream Protocol, Version 2 (ST-II)", Internet Engineering Task Force (IETF) Request for Comments (RFC) 1190 Oct. 1990 , pp. 1-148.
Touch, J. et al., "The X-Bone", Third Global Internet Mini-Conference at Globecom '98, Sydney, Australia (pp. 44-52 of mini-conference) Nov. 1998 , pp. 59-68.
Traina, P. , "BGP-4 Protocol Analysis", Internet Engineering Task Force (IETF) Request for Comments (RFC) 1774 Mar. 1995 , pp. 1-10.
Traina, P. , "Experience with the BGP-4 Protocol", *Internet Engienering Task Force (IETF) Request for Comments (RFC)* 1773 Mar. 1995 , pp. 1-9.
Wessels, D. et al., "Application of Internet Cache Protocol (ICP), Version 2", *Internet Engineering Task Force (IETF) Request for Comments (RFC)* 2187 Sep. 1997 , pp. 1-24.
Wessels, D. et al., "Internet Cache Protocol (ICP), Version 2", Internet Engineering Task Force (IETF) Request for Comments (RFC) 2186 Sep. 1997 , pp. 1-9.
European Examination Report, dated Oct. 25, 2017, Application No. 06717386.4, filed Jan. 3, 2006; 3 pgs.
European Examination Report, dated Feb. 9, 2016, Application No. 06717386.4, filed Jan. 3, 2006; 4 pgs.

\* cited by examiner

REGISTRATION REDIRECT SERVER

This application is a divisional of U.S. patent application Ser. No. 13/336,813, now U.S. Pat. No. 9,088,599, which is a divisional of U.S. patent application Ser. No. 11/027,564, now U.S. Pat. No. 8,089,972, which claims the benefit of priority to U.S. Provisional Application No. 60/567,542, filed May 3, 2004. The present application is related to U.S. patent application Ser. No. 11/271,941, U.S. patent application Ser. No. 11/009,204, U.S. Pat. No. 8,768,350, U.S. patent application Ser. No. 14/321,731, U.S. Pat. No. 7,734,019, U.S. Pat. No. 9,020,105 and U.S. patent application Ser. No. 14/698,707. The entirety of each of the aforementioned applications and patents is incorporated herein by reference for all purposes.

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever. Copyright © 2015 Level 3 Communications, Inc.

BACKGROUND

Field

Embodiments of the present invention generally relate to servicing network access requests. More particularly, embodiments of the present invention relate to techniques for registering communication devices, such as Voice over Internet Protocol (VoIP) phones, to the closest feature servers to facilitate roaming while also performing load balancing for capacity, scalability, and congestion control within a communication network, such as a VoIP network.

Description of the Related Art

In non-traditional telecommunications systems, services are provided via a feature server provisioned to accept access from a particular set of communication devices. Currently, a fixed many-to-one correspondence exists between communication devices and feature servers from which they may obtain service as a result of hard coded provisioning of communication devices with feature server addresses. In some cases, the provisioned feature server will become inoperable due to a failure of the feature server. When such a failure occurs, the services provided to corresponding communication devices may be unavailable or severely limited. Similarly, network access to the feature server may become so congested that the quality of response from the provisioned feature server may be limited. Additionally, such an inflexible communication network architecture would necessarily increase latency in the signaling path for communication devices roaming outside of the geographic area of the feature server to which they are homed.

Hence, there exists a need in the art for advanced systems and methods for offering telecommunication services.

BRIEF DESCRIPTION OF THE SEVERAL VIEWS OF THE DRAWINGS

Embodiments of the present invention are illustrated by way of example, and not by way of limitation, in the figures of the accompanying drawings and in which like reference numerals are used throughout to refer to similar components. In some instances, a sub-label consisting of a lower case letter is associated with a reference numeral to denote one of multiple similar components. When reference is made to a reference numeral without specification to an existing sub-label, it is intended to refer to all such multiple similar components.

SUMMARY

Figure 1:
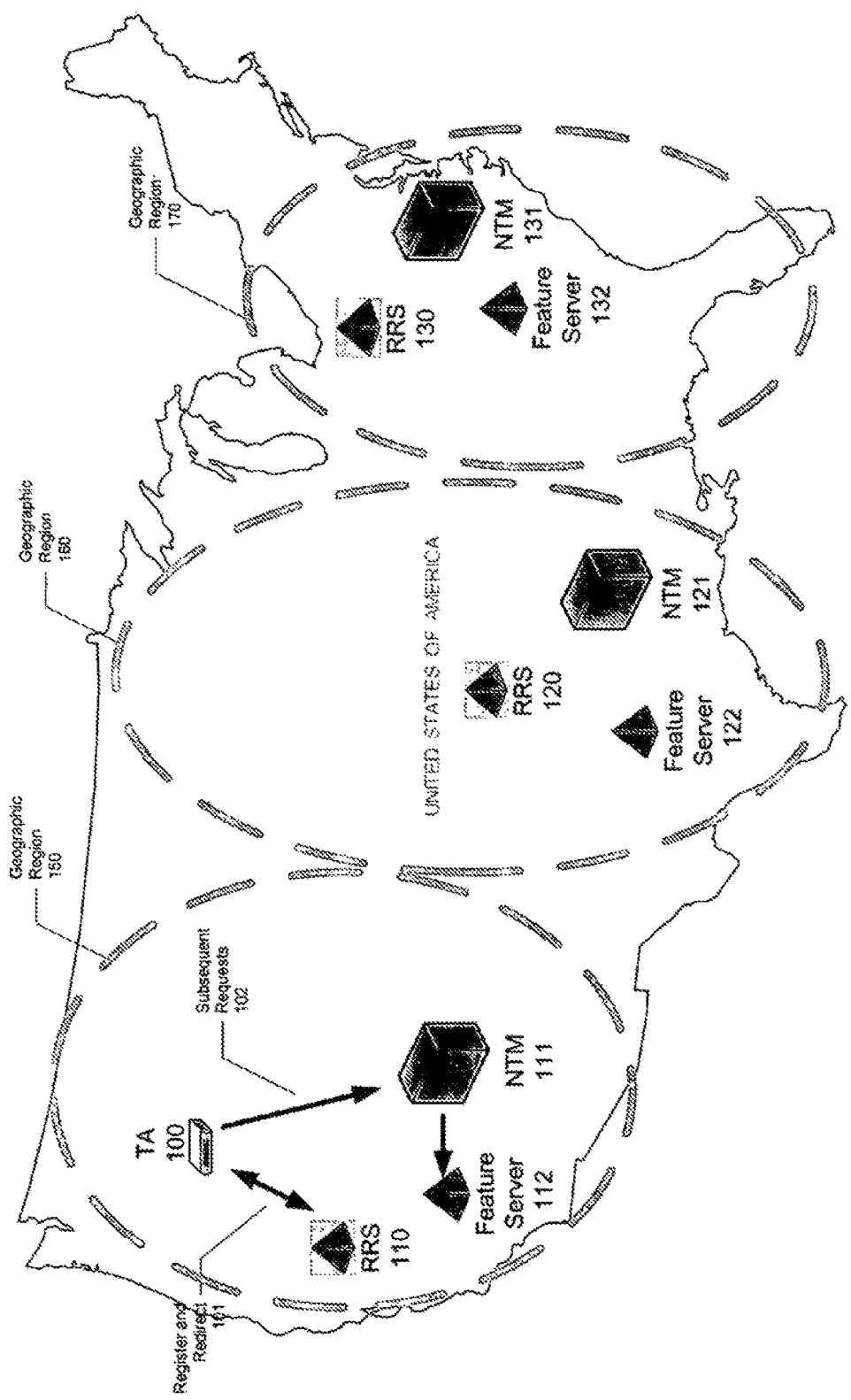
FIG. 1 depicts an exemplary simplified physical architecture of a communication network and a registration call flow scenario according to one embodiment of the present invention.

Systems and methods are described for servicing network access requests. According to one embodiment, a communication network architecture is disclosed that includes multiple feature servers, multiple registration redirect servers (RRSs), and multiple communication devices. The feature servers provide services to the communication devices. The RRSs each service a shared virtual Internet Protocol (IP) address and perform load balancing of registration requests on behalf of multiple feature servers located geographically proximate to the RRS. The communication devices are configured to issue initial registration requests intended for any of the feature servers to the shared virtual IP address, whereby upon issuing an initial registration request, a communication device is directed to a particular feature server that is associated with a RRS that is closest to the communication device, and where the particular feature server is selected by a load balancing routine executing on the RRS.

This summary provides only a general outline of some embodiments according to the present invention. Many other objects, features, advantages and other embodiments of the present invention will become more fully apparent from the following detailed description, the appended claims and the accompanying drawings.

DETAILED DESCRIPTION

Systems and methods for servicing network access requests are described. Broadly stated, various embodiments of the present invention provide for dynamically registering a communication device or terminal adapter ("TA") with a feature server, such as a registrar server.

According to one embodiment, a TA uses a DNS to find a load balancer. The load balancer redirects the TA to a NAT traversal manager ("NTM"). Behind the NTM, there could be another load balancer that directs a registration request to a particular feature server or cluster of feature servers. In some cases, the particular feature server is a home feature server (e.g., home switch) for the TA. In the event that the TA roams to another location or in the event that the load balancer directs the TA to another feature server because of network congestion or failure, the feature server receiving the registration request (e.g., floating or visiting feature server) may load the subscriber information for the TA and notify the home feature server that the feature server receiving the registration request is now supporting the TA.

The network may try to communicate with the TA via the home feature server. In such a situation, the home feature server may redirect the network to the feature server that received the registration request. Using such an approach, a communication device or TA is not limited to accessing the network by predefined feature servers, but can rather register with the network and be provisioned with any of a number of feature servers. In some cases, the systems and methods of the present invention can provide higher reliability and allow for a more efficient form of communication device roaming. Further, in various cases, the systems and methods of the present invention can provide a mechanism for performing congestion control in the network. Based on the disclosure provided herein, one of ordinary skill in the art will recognize a number of other advantages that can be achieved using systems and methods in accordance with embodiments of the present invention.

In one embodiment, a method is provided for establishing a session for a Voice over IP (VoIP) call. A voice client coupled to a communication network issues a Session Initiation Protocol (SIP) Register message to a shared virtual IP address, such as an Anycast address, serviced by multiple load balancing registration redirect servers coupled to the communication network. The SIP Register message is received by the registration redirect server determined to be closest to the voice client based on metrics associated with the communication network. The closest registration redirect server then causes the SIP Register message to be directed to a particular registrar server associated with the registration redirect server based on a load balancing routine.

According to one embodiment, a novel communication network architecture is provided, including multiple feature servers, multiple load balancing registration redirect servers, and multiple geographically dispersed communication devices. The feature servers provide services to the communication devices within the communication network. The load balancing registration redirect servers each service a shared virtual Internet Protocol (IP) address common to all of the registration redirect servers and perform load balancing of service requests on behalf of two or more of the feature servers that are located geographically proximate to the registration redirect server. The communication devices are communicatively coupled with the registration redirect servers and are configured to issue initial registration service requests intended for any of the feature servers to the shared virtual IP address. In this manner, upon issuing the initial registration service request, a communication device is directed to a particular feature server selected by a load balancing routine that is associated with a registration redirect server that is closest to the communication device.

In the following description, for the purposes of explanation, numerous specific details are set forth in order to provide a thorough understanding of embodiments of the present invention. It will be apparent, however, to one skilled in the art that embodiments of the present invention may be practiced without some of these specific details. In other instances, well-known structures and devices are shown in block diagram form.

Embodiments of the present invention include various steps, which will be described below. The steps may be performed by hardware components or may be embodied in machine-executable instructions, which may be used to cause a general-purpose or special-purpose processor programmed with the instructions to perform the steps. Alternatively, the steps may be performed by a combination of hardware, software, and/or firmware.

Embodiments of the present invention may be provided as a computer program product which may include a machine-readable medium having stored thereon instructions which may be used to program a computer (or other electronic devices) to perform a process. The machine-readable medium may include, but is not limited to, floppy diskettes, optical disks, compact disc read-only memories (CD-ROMs), and magneto-optical disks, ROMs, random access memories (RAMs), erasable programmable read-only memories (EPROMs), electrically erasable programmable read-only memories (EEPROMs), magnetic or optical cards, flash memory, or other type of media/machine-readable medium suitable for storing electronic instructions. Moreover, embodiments of the present invention may also be downloaded as a computer program product, wherein the program may be transferred from a remote computer to a requesting computer by way of data signals embodied in a carrier wave or other propagation medium via a communication link (e.g., a modem or network connection).

TERMINOLOGY

Brief definitions of terms used throughout this application are given below.

The terms "closeness," "nearness," "closest," "nearest" and the like are used herein in a logical sense and are not necessarily limited to physical proximity. According to one embodiment, one or more or a combination of various network metrics, such as link congestion, cost metrics assigned to given routers, etc., are relied upon to determine the closeness or nearness (e.g., the logical proximity) of two devices communicatively coupled to a packet-based network. In some cases, the logical proximity between devices is determined by or based upon link-state information and/or routing protocols, such as Open Shortest Path First (OSPF), Interior Gateway Routing Protocol (IGRP), Routing Information Protocol (RIP), Intermediate System-to-Intermediate System (IS-IS) or the like. In one embodiment, the closest or nearest of a plurality of load balancing registration redirect servers to a particular client is the registration redirect server with which the client is capable of communicating and experiencing the least latency and/or traversing the fewest hops. Depending on the context, this notion of logical proximity may have different meanings. For example, in the context of a client connected directly to the target service network in which the novel registration redirect servers reside, the client may be directed to the geographically closest operating registration redirect server based on routing metrics within the target service network. In the context of a client connected indirectly to the target service network in which the novel registration redirect servers reside (via a border network, for example), the client may be directed to the registration redirect server geographically closest to that Internet Service Provider's (ISP's) preferred point of interconnection with the target service network.

For the purposes of this document, the phrase "communicably coupled" or "communicatively coupled" is used in its broadest sense to mean coupling in any fashion that allows information to be passed between network devices. Thus, for example, communicably coupled devices can be coupled either directly or indirectly. Further, communicably coupled devices can be, for example, electrically coupled, optically coupled, wirelessly coupled, and/or physically coupled.

The phrase "communication device" or the term "client" generally refers to a device whereby communications or other information are directly or indirectly introduced to or received from a communication network. Thus, as just some examples, communication devices may include, but are not limited to, IP phones, H.323 phones, Session Initiation Protocol (SIP) phones, VoIP phones, Terminal Adapters (TAs), Analog Terminal Adapters (ATAs), Personal Digital Assistants (PDAs), cellular or mobile phones, Personal Computers (PCs), Digital Subscriber Line (DSL) modems, dial up modems, cable modems and the like. In the document the terms TA and communication device can generally be used interchangeably.

The phrase "communication network" or term "network" generally refers to a group of interconnected devices capable of exchanging information. A communication network may be as few as several personal computers on a Local Area Network (LAN) or as large as the Internet, a worldwide network of computers. As used herein "communication network" is intended to encompass any network capable of transmitting information from one entity to another. In one particular case, a communication network is a Voice over Internet Protocol (VoIP) network. In some cases, a communication network may be comprised of multiple networks, even multiple heterogeneous networks, such as one or more border networks, voice networks, broadband networks, service provider networks, Internet Service Provider (ISP) networks, and/or Public Switched Telephone Networks (PSTNs), interconnected via gateways operable to facilitate communications between and among the various networks.

The terms "connected" or "coupled" and related terms are used in an operational sense and are not necessarily limited to a direct or physical connection or coupling.

The phrase "feature server" generally refers to a server that is operable to provide one or more services supported by a communications network, such as a voice network. For example, a feature server may provide telecommunications services, such as caller identification, call forwarding, voice mail, and/or the like. In one embodiment, a feature server comprises a Class-5 soft switch. In other embodiments, a feature server may represent, a registrar server.

The phrases "in one embodiment," "according to one embodiment," and the like generally mean the particular feature, structure, or characteristic following the phrase is included in at least one embodiment of the present invention, and may be included in more than one embodiment of the present invention. Importantly, such phases do not necessarily refer to the same embodiment.

If the specification states a component or feature "may", "can", "could", or "might" be included or have a characteristic, that particular component or feature is not required to be included or have the characteristic.

The phrase "load balancer" generally refers to a logical or physical device that performs load balancing, such as hardware load balancing solutions performed by computer systems, switches and/or routers, software load balancing solutions, load balancing servers and the like. According to one embodiment load balancer software is run on an Edge Proxy Server, such as a Netra 240 Server available from Sun Microsystems. Depending upon the particular implementation and the type of services to be supported, a load balancer may be stateful, stateless, or semi-stateful. According to one embodiment, the load balancer comprises a registration redirect server configured to redirect client SIP Register messages to an appropriate NTM-feature server pair that is closest to the client.

The phrase "load balancing" generally refers to a method of taking multiple requests or processes and distributing each of them across multiple computers or network devices. According to one embodiment the distribution among the multiple computers or network devices is based on how busy the computer or network device is or based on historical information regarding how previous requests or processes were distributed among the devices.

As used herein, the phrase "network resource list" is used in its broadest sense to be a list of any resources available in a network.

The phrase "registrar server" generally refers to a particular type of feature server that performs registration and/or call routing. According to one embodiment, a registrar server processes and maintain SIP Registrations for each of the call parties to enable it to route calls when a SIP INVITE is received. For example, when one user wishes to call another, both clients may perform a SIP Registration with the registrar server; this provides enough information for the registrar server to route the call when the INVITE is later sent from one user to the other.

The term "responsive" includes completely or partially responsive.

FIG. 1 depicts an exemplary simplified physical architecture of a communication network and a registration call flow scenario according to one embodiment of the present invention. According to the present example, a communication network spans a plurality of geographic regions 150, 160 and 170. Each geographic region 150, 160 and 170 includes a load balancer, e.g., a registration redirect server (RRS) and one or more associated NTM-feature server pairs. In one embodiment, a virtual IP address, such as an Anycast address, is shared and advertised to the communication network routing protocol by all of the RRSs 110, 120 and 130 in a particular region of the network, e.g., the United States of America or North America.

Virtual IP addressing, e.g., Anycast addressing, is a form of communication that takes place over a network between a client and the "nearest" of a set of network devices that can respond to the client's service request, where "nearest" is determined by network metrics. When a client issues a request to an Anycast address, routers within the communication network direct the request to the nearest of the network devices advertising the Anycast address as determined by the most recent network metrics observed or calculated by the routers or otherwise provided to the routers.

The communication network architecture of the present example associates a virtual IP address, such as a shared Anycast address, with multiple load balancing RRSs residing in front of corresponding NTM-feature server pairs. The RRSs each advertise the virtual IP address to the routing protocol of the communication network, such as the OSPF routing protocol. This allows service requests to be directed to the closest RRS based on existing network metrics. For example, in the context of a communications network implementing the OSPF routing protocol, service requests directed to a shared Anycast address will reach the closest RRS based on OSPF rules. The closest RRS may then balance the load across multiple NTM-feature server pairs associated with the RRS in accordance with customary load balancing techniques. For example, the NTMs and/or feature servers associated with a particular RRS may provide periodic status updates to the RRS to allow the RRS to distribute service requests appropriately across the feature servers. According to one embodiment, in a SIP environment, a RRS may use a SIP OPTIONS message to test liveliness of NTMs and/or feature servers. The NTMs and/or feature servers may provide load feedback to the RRS via a SIP OPTIONS response message.

In this simplified illustration, TA 100 resides in geographic region 150 at the time it issues a registration request, e.g., a SIP Register message, to the virtual IP address shared by RRSs 110, 120 and 130. Assuming RRS 110 is determined to be the closest according to the communication network routing protocol rules, then the registration request is directed to RRS 110. RRS 110 then redirects the TA 100 to a local NTM-feature server pair based on a load balancing routine by responding with a redirect message. According to one embodiment, the redirect message comprises a SIP Moved Temporarily Message with one or more redirect URLs. This registration and redirect sequence is illustrated in FIG. 1 by register and redirect arrow 101. Once redirected, the TA 100, sends subsequent requests 102 to one of the prioritized list of NTMs, e.g., NTM 111, provided by the redirect message.

While in various embodiments described herein, the RRSs perform redirection of service request by messaging the originating communication device, in alternative embodiments, the RRSs may perform one or more other service request processing methodologies, such as "redirection by proxying" and/or "proxy forwarding," in addition to or rather than pure "redirection." When performing redirection and redirection by proxying, the RRS causes the communication device's service request to be directed to a particular feature server and is thereafter excluded from subsequent messaging flow exchanged between the particular feature server and the communication device relating to the session. When performing proxy forwarding, the RRS remains within subsequent messaging flow exchanged between the particular feature server and the communication device relating to the session. The service request processing methodologies of "redirection by proxying" and "proxy forwarding" are more fully described in U.S. patent application Ser. No. 11/271,941 entitled "Geo-Locating Load Balancing" and filed by Sirkin. Again, the entirety of the aforementioned patent application was previously incorporated herein by reference.

Figure 2:
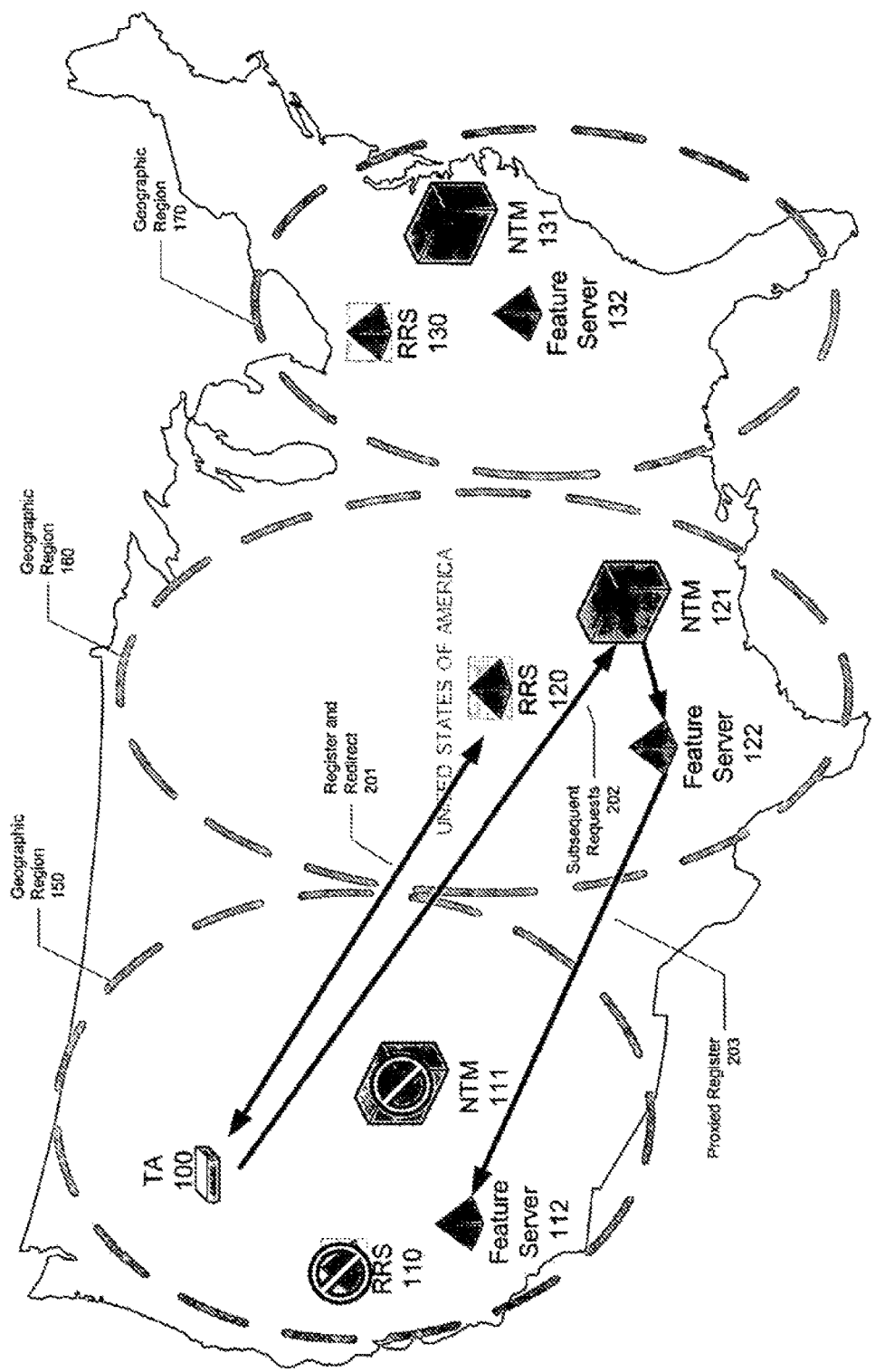
FIG. 2 depicts the exemplary simplified physical architecture of a communication network of FIG. 1 and an alternative registration call flow scenario according to one embodiment of the present invention.

FIG. 2 depicts the exemplary simplified physical architecture of a communication network of FIG. 1 and an alternative registration call flow scenario according to one embodiment of the present invention. According to this registration call flow scenario, RRS 110 and NTM 111 in the current geographic region 150 of the TA 100 have been determined to be unavailable for some reason. Consequently, the registration request, e.g., a SIP Register message, issued by the TA 100 to the virtual IP address shared by RRSs 110, 120 and 130 is directed to the next closest RRS, i.e., RRS 120 in geographic region 160. RRS 120 then redirects the TA 100 to a local NTM-feature server pair based on a load balancing routine by responding with a redirect message. According to one embodiment, the redirect message comprises a SIP Moved Temporarily Message with one or more redirect URLs. This registration and redirect sequence is illustrated in FIG. 2 by register and redirect arrow 201. Once redirected, the TA 100, sends subsequent requests 202 to one of the prioritized list of NTMs, e.g., NTM 121, provided by the redirect message.

As discussed further below, the feature server 122 ultimately receiving the registration request (e.g., a floating or visiting feature server) may load subscriber information for the TA 100 and notify the home feature server 122 that it is now supporting the TA 100. In the present example, this messaging is represented by proxied register 203.

Figure 3:
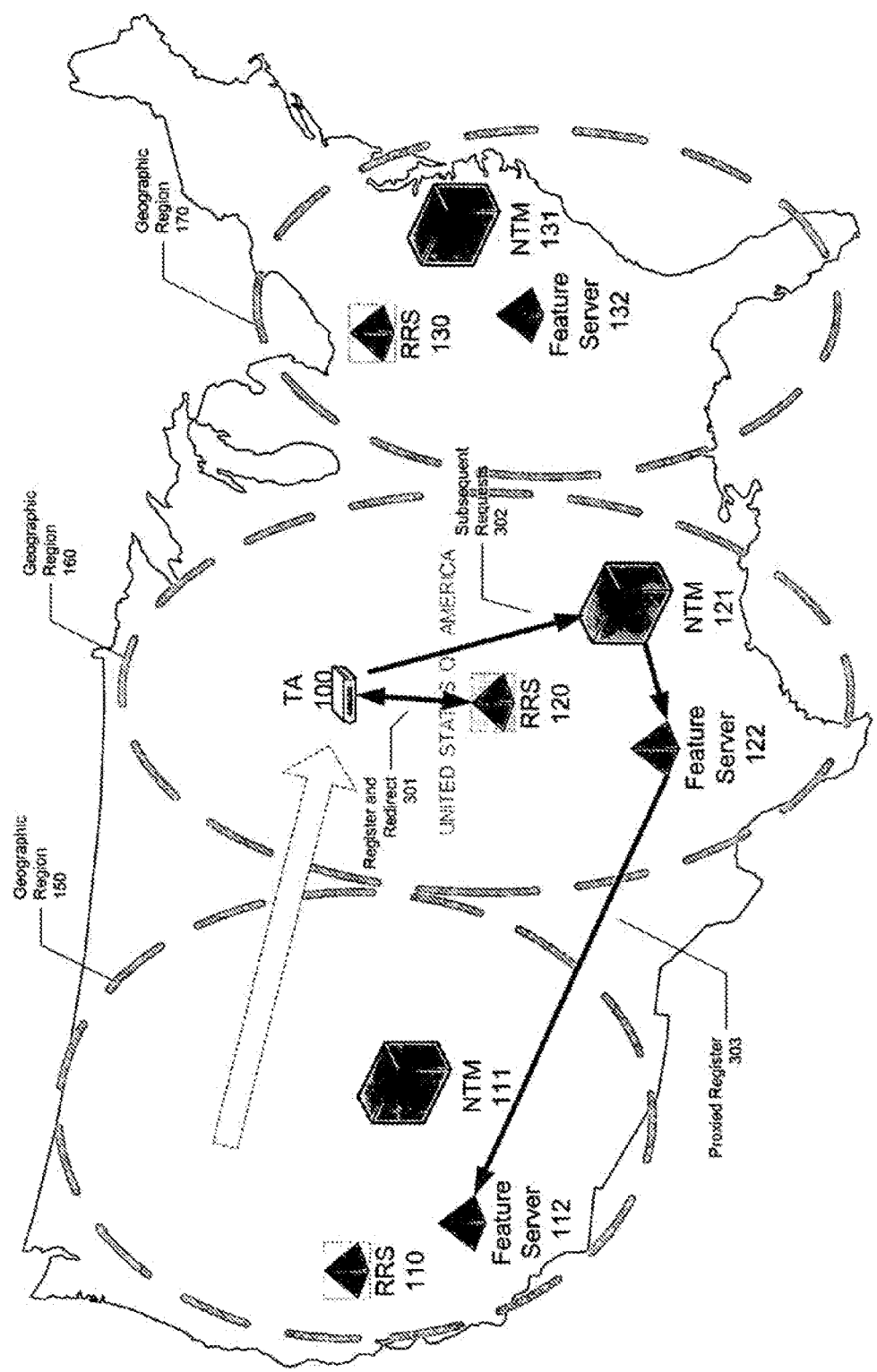
FIG. 3 depicts the exemplary simplified physical architecture of a communication network of FIG. 1 and another alternative registration call flow scenario according to one embodiment of the present invention.

FIG. 3 depicts the exemplary simplified physical architecture of a communication network of FIG. 1 and another alternative registration call flow scenario according to one embodiment of the present invention. According to this registration call flow scenario, TA 100 has roamed outside of the geographic region 150 of the RRS 110 to which it is homed. TA 100 is now located within geographic region 160. Consequently, a registration request, e.g., a SIP Register message, issued by the TA 100 to the virtual IP address shared by RRSs 110, 120 and 130 is directed to the closest RRS, i.e., RRS 120. As described earlier, RRS 120 then redirects the TA 100 to a local NTM-feature server pair based on a load balancing routine by responding with a redirect message. According to one embodiment, the redirect message comprises a SIP Moved Temporarily Message with one or more redirect URLs. This registration and redirect sequence is illustrated in FIG. 3 by register and redirect arrow 301. Once redirected, the TA 100, sends subsequent requests 302 to one of the prioritized list of NTMs, e.g., NTM 121, provided by the redirect message.

As mentioned above and discussed further below, when a non-home feature server is the recipient of a registration request, the feature server may load subscriber information for the TA 100 and notify the home feature server that it is now supporting the TA 100. In the present example, this messaging is represented by proxied register 303.

Figure 4A:
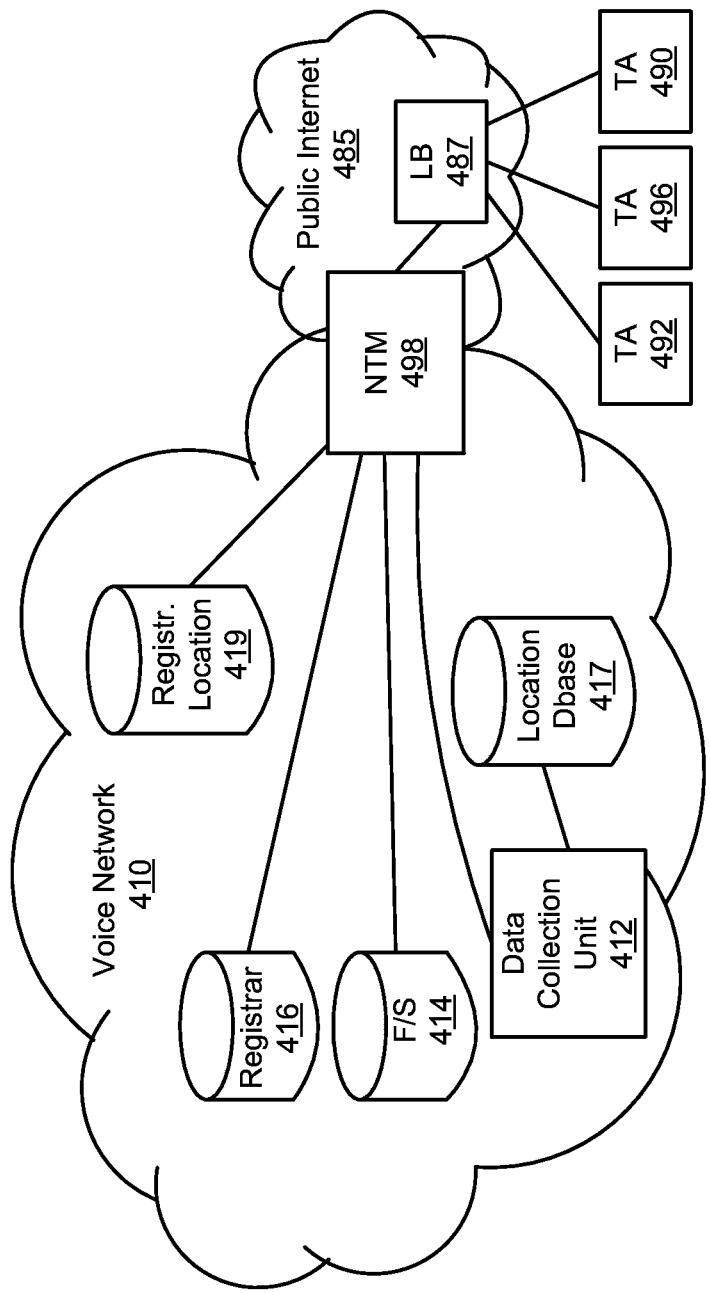
FIG. 4A depicts a communication network in accordance with some embodiments of the present invention.

Turning to FIG. 4A, a communication network 400 operable in accordance with various embodiments of the present invention is illustrated. Communication network 400 includes a voice network 410 with one or more registrar servers 416, one or more feature servers 414, one or more data collection units 412, and one or more location databases 417. Registrar server 416 is operable to direct communications. Feature server 414 is operable to provide one or more telecommunications services provided via voice network 410. For example, feature server 414 may provide caller identification, call forwarding, voice mail, and/or the like. In one particular case, feature server 414 is a Class-5 soft switch.

Data collection unit 412 is operable to gather information from or about one or more communication devices accessing voice network 410. Such information may include, for example, the physical location of a communication device and identification information about the communication device. This information can be updated to location database 417. Location database 417 may be used to provide physical location information to an Automatic Location Identification ("ALI") database (not shown) as known in the art to support one or more Public Safety Answering Points ("PSAP") (not shown). In this manner, physical location information can be used to, among other things, dispatch emergency services in the event an emergency call is placed using the communication device. The process of updating the physical location of the communication device and for utilizing the updated physical location information is more fully described in U.S. Pat. No. 8,768,350 entitled "Systems and Methods for Locating Endpoints in a Communication Network", and filed by Hagens et al; and U.S. Pat. No. 7,734,019 entitled "Systems and Methods for Third Party Emergency Call Termination", and filed by Terpstra. Again, the entirety of each of the aforementioned patent applications was previously incorporated herein by reference.

In addition, network 400 includes one or more NAT Traversal Managers ("NTM") 498. In the illustrated configuration, NTM 498 is operable to facilitate communications between a public internet 485 and voice network 410. NTMs are available from a number of sources, with a number of functional capabilities, and in a number of different configurations. Based on the disclosure provided herein, one of ordinary skill in the art will recognize one or more appropriate NTMs capable of supporting the disclosed functions. In some embodiments, NTM 498 is operable to traverse home firewalls by keeping a pinhole open for sending SIP Requests to an accessing communication device. This may be used to reduce or eliminate the possibility of a home firewall blocking SIP Requests related to establishing a call to the communication device. The communication device can also participate in keeping the pinhole open by periodically sending SIP Register messages to NTM 498.

In the present example a number of non-traditional communication devices are connected to the communication network 400 from a number of physical locations. These devices are communicatively coupled to the voice network 410 via the public internet 485. Such non-traditional communication devices can include, but are not limited to, one or more fixed location communication devices 490, 492 stationed in various physical locations, and/or one or more roaming communication devices 496 capable of moving between various physical locations. Such communication devices can be, but are not limited to, traditional analog telephones communicably coupled to public internet 485 via an Analog Terminal Adapter (ATA), Voice Over Internet Protocol (VoIP) phones, computers operable to transmit via public internet 485, Personal Digital Assistants (PDA) operable to transmit via public internet 485, and/or the like. As illustrated, public internet 485 includes a load balancer 487 (e.g., a redirect registration server) operable to redirect a communication device to an appropriate voice network access point.

Figure 4B:
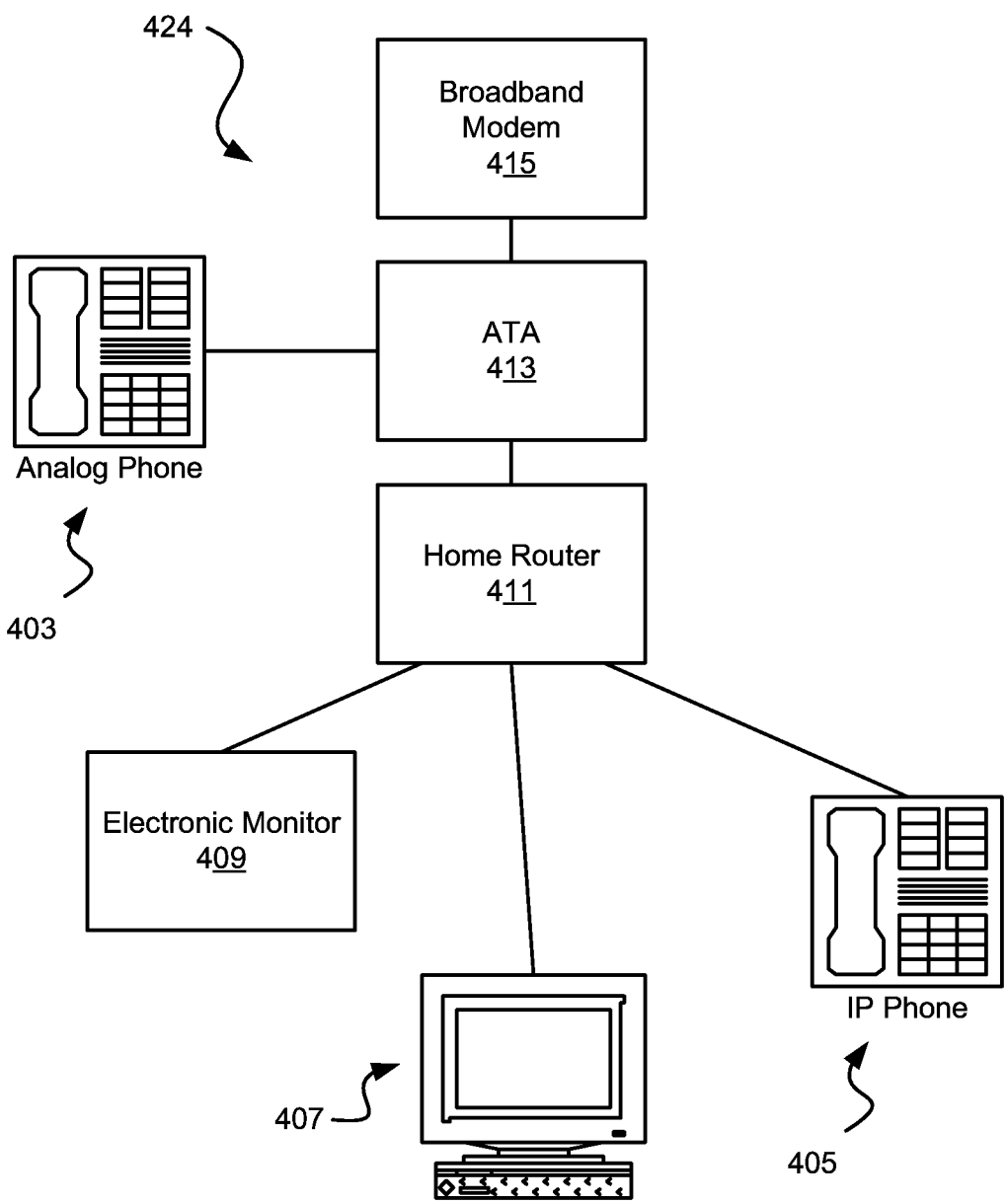
FIG. 4B depicts and exemplary non-traditional communication device useful in accordance with various embodiments of the present invention.

Turning to FIG. 4B, an exemplary configuration of a compound, non-traditional communication device 424 useful in relation to embodiments of the present invention is illustrated. Non-traditional communication device 424 includes a broadband modem 415 capable of coupling to a public Internet or other border network, an Analog Terminal Adapter ("ATA") 413 capable of attaching a traditional analog telephone 403 to broadband modem 415, and a home router 411 capable of allowing access for one or more communication devices to broadband modem 415. Such communication devices can be, for example, an electronic monitor 409, a personal computer 407, and an IP telephone 405. Electronic monitor 409 may be any device or system capable of monitoring a defined set of events and reporting on that set of events. Thus, for example, electronic monitor 409 can be a home security system or a patient health status monitoring system. Such systems may be capable of automatically initiating calls and thereafter transmitting various information. In one particular case the system may monitor patient health status or home security status. When a particular status is recognized, an emergency call can be initiated, and information relevant to the emergency can be transmitted. Based on the disclosure provided herein, one of ordinary skill in the art will recognize a number of electronic monitoring equipment that can be associated with non-traditional communication device 424, and a number of situations that can be monitored by such devices.

It should be noted that the configuration is merely exemplary and that many configurations can be used in relation to embodiments of the present invention. For example, PC 407 may connect directly to broadband router 415, and in some cases, broadband router 415 may be replaced by a dial up modem. Alternatively, IP phone 405 may include a broadband modem capable of coupling directly to a border or other network. Based on the disclosure provided herein, one of ordinary skill in the art will recognize a number of other configurations and/or equipment either apart or in combination that can serve the function of non-traditional communication device 424.

Figure 5:
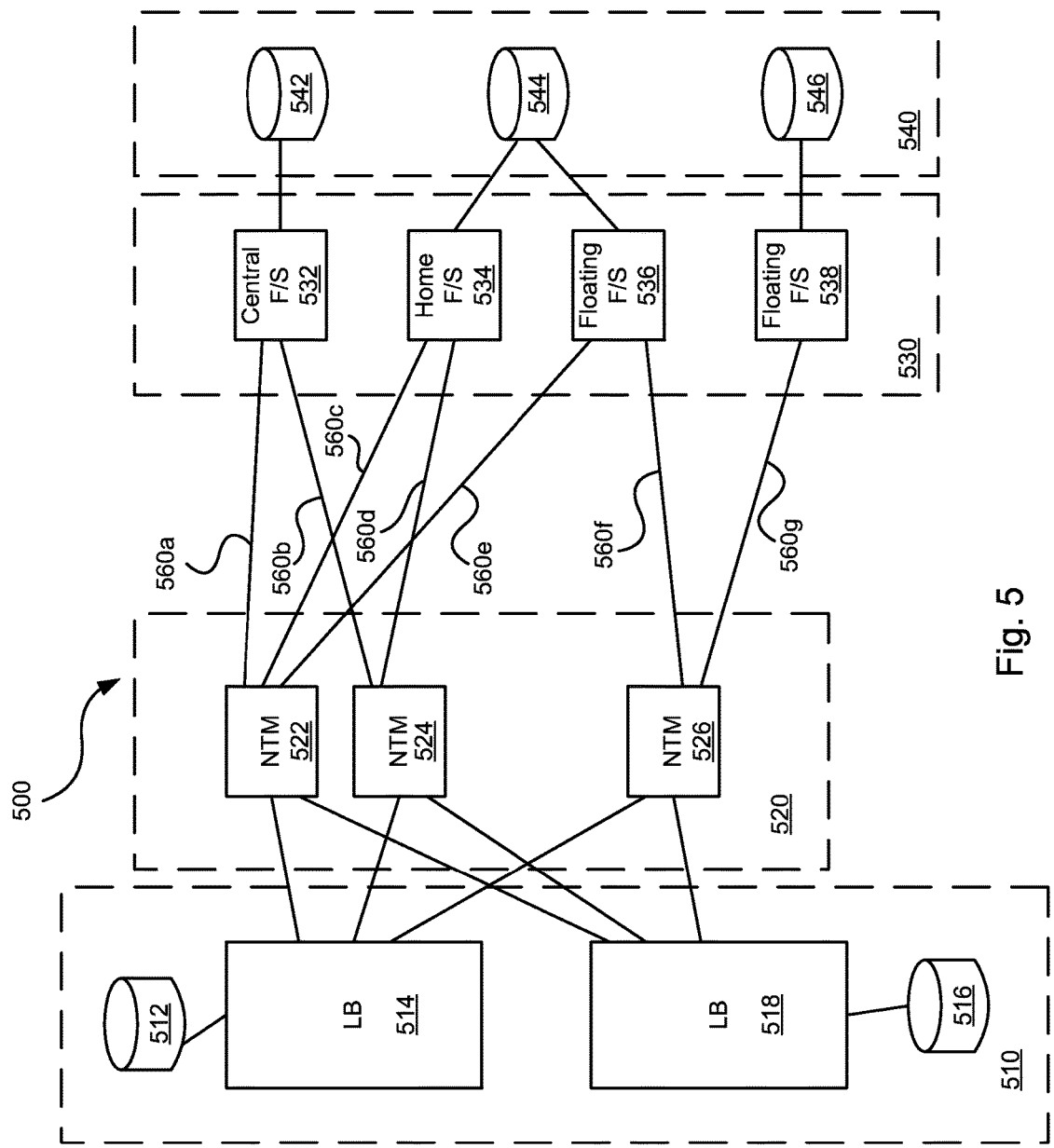
FIG. 5 depicts a system in accordance with various embodiments of the present invention.

Turning to FIG. 5, a system 500 capable of dynamically provisioning feature server access in accordance with one or more embodiments of the present invention is illustrated. System 500 includes a load balancer group 510, an NTM group 520, a feature server group 530, and a telecommunication service database group 540. Load balancer group 510 includes one or more load balancers 514, 518 respectively associated with load balancer caches 512, 516 as are known in the art. In particular, load balancers 514, 518 and load balancer caches 512, 516 can be selected from those commercially available and presently deployed.

NTM group 520 includes one or more NTMs 522, 524, 526, and feature server group 530 includes one or more feature servers 532, 534, 536, 538. Feature servers 532, 534, 536, 538 and NTMs 522, 524, 526 are paired as indicated by routes 560. As illustrated, the following NTM and feature server pairs exist: (1) NTM 522 and feature server 532, (2) NTM 522 and feature server 534, (3) NTM 522 and feature server 536, (4) NTM 524 and feature server 532, (5) NTM 524 and feature server 534, (6) NTM 524 and feature server 536, (7) NTM 526 and feature server 536, and (8) NTM 526 and feature server 538. It should be understood that the pairs are merely illustrative and that many different NTM and feature server pairs can be utilized in accordance with embodiments of the present invention. For example, an NTM can be paired with only one feature server, or with many feature servers. Similarly, a feature server can be paired with only one NTM, or with a number of NTMs Feature server group 530 includes one or more floating feature servers 536, 538, a home feature server 534, and a central feature server 532. Each of theses feature servers are described from the perspective of a communication device. Thus, the feature server provisioned to support the communication device is home feature server 534, and central feature server 532 provides at least rudimentary network access where home feature server 534 is unavailable. In one particular case, feature server 532 is a database incorporated with database 542, and is not an actual feature server. Floating feature servers 536, 538 can be accessed by the communication device, but such feature servers may rely on one or both of home feature server 534 and central feature server 532 to service network requests originating from the communication device. It should be noted that one or both of floating feature servers 536, 538 can be provisioned to operate as a home feature server for another communication device. In such a situation, the feature would act as a floating feature server to one communication device, and as a home feature server to another communication device. In some cases, central feature server 532 can act as a floating feature server and/or a home feature server depending upon the configuration of system 500. In one particular case, the feature servers are class five soft switches specially tailored for operation in accordance with embodiments of the present invention. Further, it should be noted that when accessed by a communication device, a floating feature server can receive service information about the communication device, and can dynamically become the home feature server for the communication device.

Telecommunication service database group 540 includes one or more telecommunication service databases 542, 544, 546 associated with one or more feature servers. For example, as illustrated, telecommunication service database 542 is communicably coupled to central feature server 532. Access to telecommunication service database 542 is available by accessing central feature server 532. Similarly, telecommunication service database 546 is communicably coupled to floating feature server 538, and access thereto is available via floating feature server 538. In contrast, telecommunication service database 544 is communicably coupled to both home feature server 534 and floating feature server 536. Thus, telecommunication service database 544 may be accessed via both home feature server 534 and floating feature server 536. Because home feature server 534 and floating feature server 536 share access to a common database they are referred to as "clustered". Clustered feature servers may both be considered a home feature server, because both have access to the provisioning information useful in servicing a TA. Based on the disclosure provided herein, one of ordinary skill in the art will recognize that floating feature servers can be clustered with other floating feature servers, a home feature server, and/or a central feature server. Similarly, a home feature server or central feature server can be clustered with various other feature server types.

Turning to FIG. 6, a series of flow diagrams 600, 601, 602 illustrate a method for dynamically registering an endpoint with a voice network. Following flow diagram 600, it is determined if it is time to update a load balancer cache (block 605). As will be appreciated by one of ordinary skill in the art, a load balancer maintains some awareness of network loading and network equipment status. This information may be maintained in a cache associated with the load balancer, and is used to direct network accesses in such a way that the network accesses succeed and network congestion is reduced. This information is periodically updated based on a timer associated with a particular load balancer, or some other event such as an external indication of network equipment failure. Thus, determining whether it is time to update the load balancer cache includes querying the timer or other external event. In some cases, it may be that the load balancer cache is updated immediately as network information becomes available.

Where it is determined that it is time to update the load balancer cache (block 605), the load balancer requests network status (block 607) and in turn receives status updates (block 609). These status updates are loaded into the load balancer cache (block 611). Where the load balancer cache is updated (blocks 607-611), or where the load balancer update period is not complete (block 605), it is determined whether a registration request is received from a TA (block 613). In some cases, such a registration request is received whenever a communication device is powered on or otherwise booted, and/or periodically based on a timer implemented in the communication device. This registration request is received by a load balancer that is responsible for (re)directing the request.

Where a registration request is received (block 613), the load balancer receiving the request accesses its cache to determined whether the communication device accessed the load balancer in the recent past. Where the communication device did not access the load balancer in the recent past, the load balancer creates a record for the communication device which is maintained in the load balancer cache for at least some period of time. Alternatively, where the communication device is reflected in the load balancer cache, the load balancer accesses information about the communication device.

In addition, the load balancer retrieves an ordered list of NTM and feature server pairs via which the communication device can access the network (block 615). This ordered list of NTM and feature server pairs is then sent to the communication device (block 617), and the communication device stores the ordered list (block 619). The TA accesses the ordered list and selects the first NTM and feature server pair. The TA issues a network access request to the feature server indicated in the selected NTM and feature server pair using the NTM indicated in the selected NTM and feature server pair (block 621). Where no response is received from the selected NTM and feature server pair (block 623), the network access request is issued to the next NTM and feature server pair (block 621). This process (blocks 621, 623) is repeated until an NTM and feature server pair are successfully accessed. Once a feature server is successfully accessed (block 623), the feature server is used to complete the network access, and is used to complete other network accesses occurring until the next time the communication device registers with the network (block 613) and the ordered list of NTM and feature server pairs is updated (blocks 615, 617, 619).

Based on the disclosure provided herein, one of ordinary skill in the art will recognize that the ordered list need not necessarily be limited to NTM and feature server pairs. For example, in one or more embodiments of the present invention, the ordered list identifies only feature servers, and other mechanisms are used to determine which NAT traversal manager will be used to access a selected feature server. Alternatively, a number of feature servers and NAT traversal managers may be indicated without being paired. In such a case, the communication device would select one of the NAT traversal managers and one of the feature servers to support a network access. Further, any list provided need not necessarily be ordered, or where ordered the order can mean different things including, for example, potential quality of service, network congestion, access cost, and/or the like.

Figure 6A:
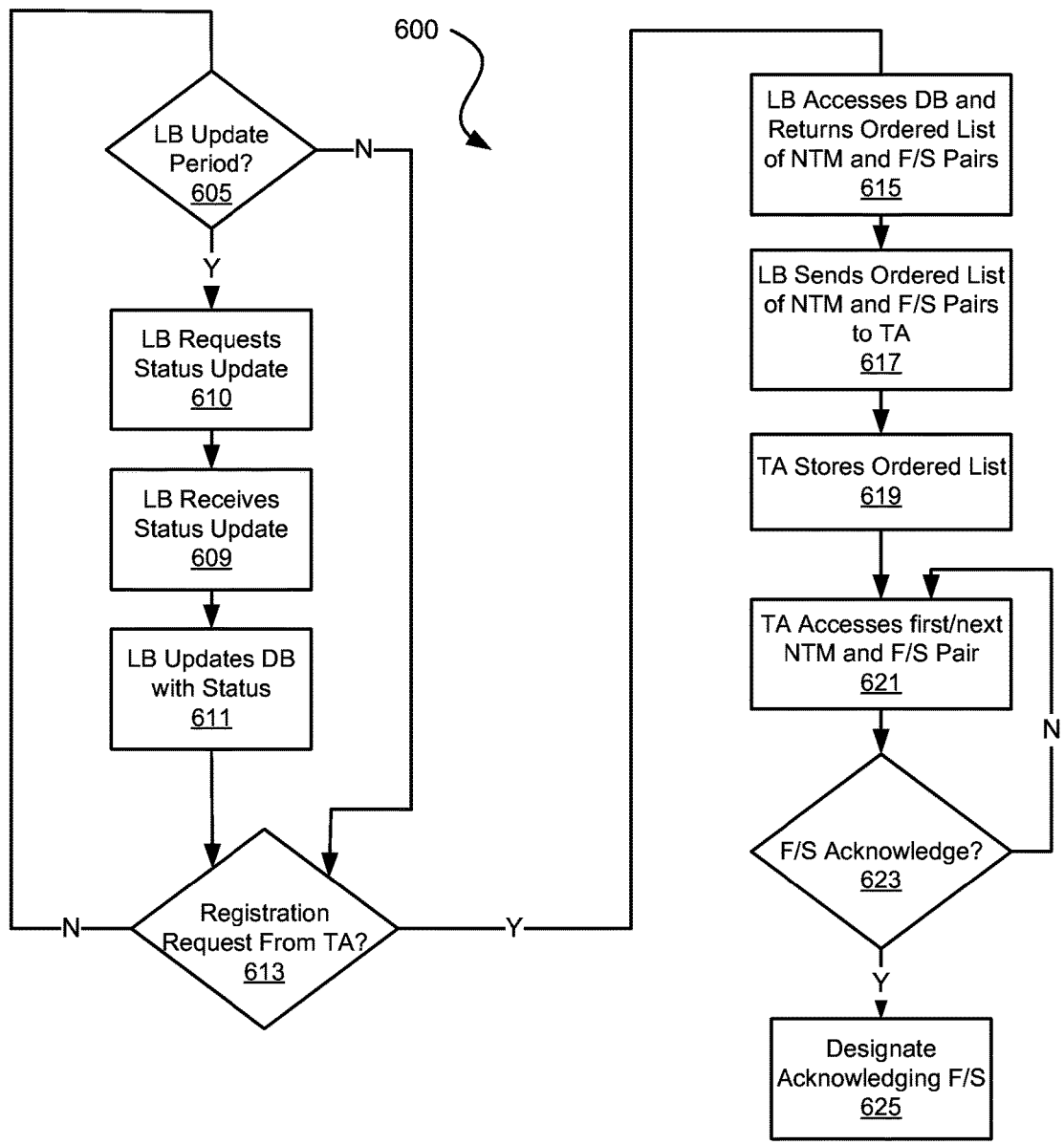
FIGS. 6A through 6D depict a method in accordance with one or more embodiments of the present invention for dynamically registering an endpoint with a network.
Figure 6B:
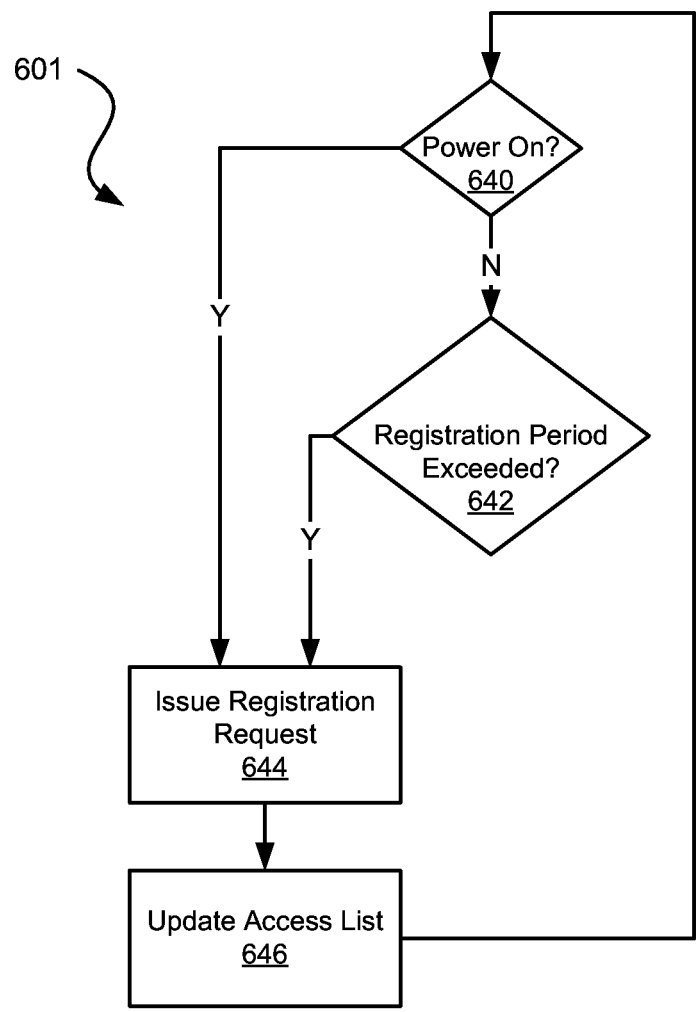

Turning to FIG. 6B, a flow diagram 601 shows a registration process from the perspective of a communication device, and in accordance with various embodiments of the present invention. Following flow diagram 610, it is determined if a communication device has been powered on or other wise booted (block 640) or whether a registration period has expired (block 642). Where either have occurred (blocks 640, 642), the communication device issues a registration request (block 644). In response, the communication device receives a list of network resources (i.e., an access list or a network resource list) which is maintained in a memory associated with the communication device (block 646).

According to one embodiment, the registration request (block 644) and subsequent registration processing proceeds as follows and as described further in the attached Appendix. In this example, a registration redirect server (RRS) is used to determine where a particular endpoint should register and tells the endpoint who it should contact. The endpoint then continues service with the feature server identified by the RRS for some expiration period defined by the RRS in the redirect message.

The SIP endpoint (e.g., TA 100) sends a SIP Register message to a provisioned URL, such as sip.level3.net that will go to the RRS. The SIP Register will contain the phone number and IP address for the TA 100.

The RRS employs routing rules and/or load balancing rules to determine the best place to redirect the TA 100. The RRS responds to the SIP Register by sending back a SIP 302 Moved Temporarily message with one or more addresses (e.g., SIP URLs) indicating where the TA 100 should send its registration requests for a set period as specified by an Expires header in the SIP 302 message.

Responsive to the SIP 302 message, the TA 100 is configured to send its SIP Register request to the first URL it pulls from the SIP 302. In FIG. 1, this URL redirects the TA 100 to NTM 111. As discussed earlier, The NTM may be configured to allow traversal of home firewalls by keeping a pinhole open for sending SIP Requests to the TA 100. The TA 100 may also participate in this process by periodically sending SIP Register messages to the NTM 111.

Based on the IP address and port on which the NTM 111 received the SIP Register message, the NTM 111 knows to which registrar server (e.g., a SIP Registrar) it needs to send the SIP Register request. When the SIP Registrar receives the SIP Register, it may authenticate the TA 100 by sending back a 401 Authorize SIP response. This message notifies the TA 100 that it needs to send another SIP Register, but with the Username and Password. As part of the redirect, the Registrar will typically access the Subscriber information to validate the Registration. This may occur by either the RRS sending the user information to the Registrar or by the Registrar querying a centralized or distributed database for the information.

According to the present example, when the TA 100 receives the SIP 401 response, it will form another SIP Register and include the Username and Password. It will send the SIP Register back to the Registrar via the NTM 111.

Figure 6C:
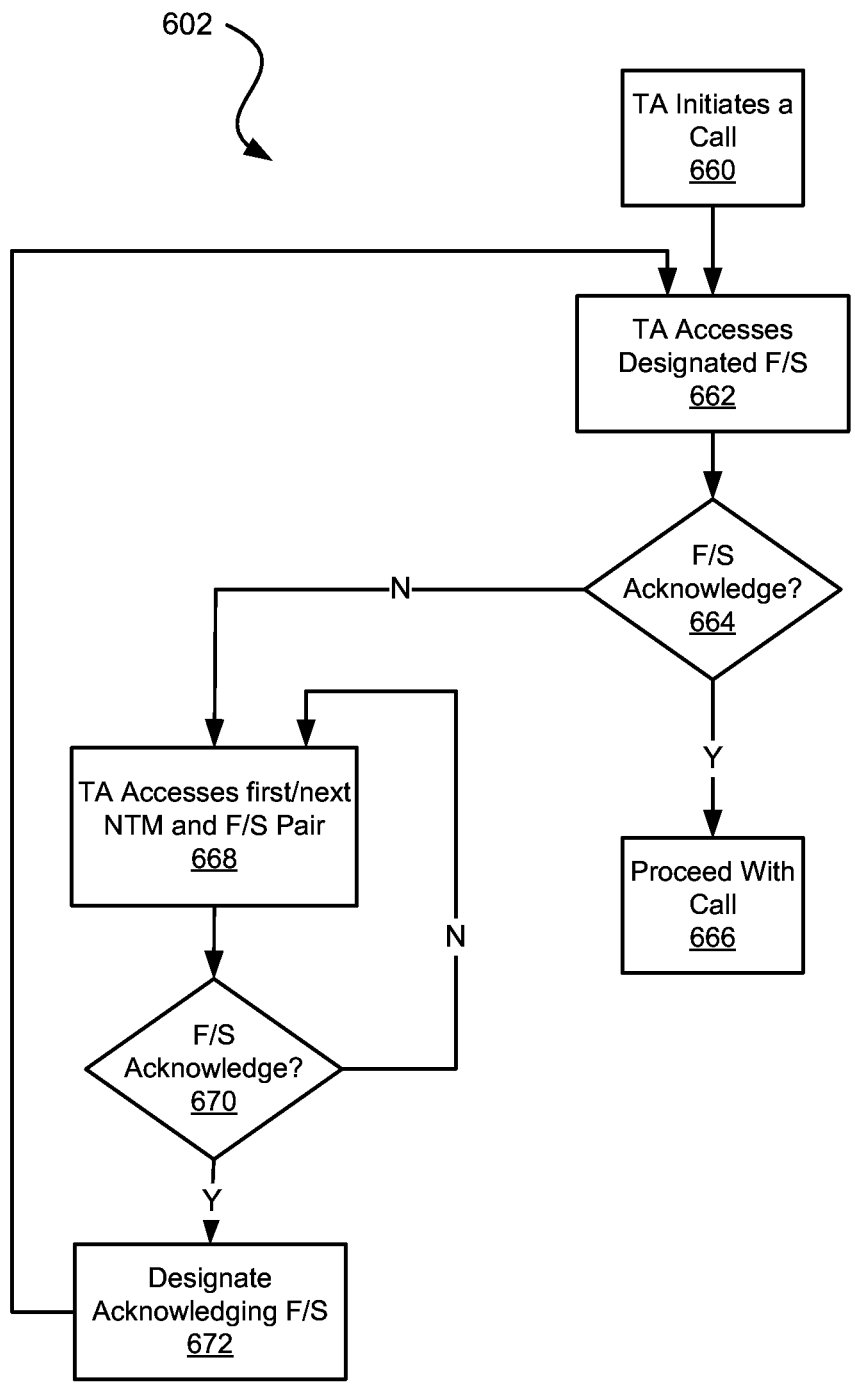

Turning to FIG. 6C, a flow diagram 602 shows a network access which is, in this case, a telephone call from the perspective of a communication device. Following flow diagram 602, a communication device initiates a call (block 660). In initiating the call, the communication device sends a message including the originating phone number and the destination phone number to the designated feature server (block 662). Where the designated feature server is paired with a NAT traversal manager, the message is sent to the designated feature server via the paired NAT traversal manager. Where the feature server acknowledges the request (block 664), the call is processed by the feature server (block 666). As is known in the art, this call processing can include signaling the receiving communication device regarding the incoming call, and setting up a media path between the originating communication device and the receiving communication device. The media path is maintained until the call is completed.

Alternatively, where for some reason the accessed feature server fails to acknowledge the network access request (block 664), the communication device accesses the next NTM and feature server pair from the list of NTM and feature server pairs (block 668). Where the feature server from the NTM and feature server pair responds (block 670), the responding feature server is designated as the feature server to be used for servicing network accesses (block 672). Otherwise, the next NTM and feature server pair is identified from the network resource list and accessed (blocks 668, 670). This process continues until an available feature server is identified.

Once a feature server is designated (blocks 668, 670, 672), the communication device issues a network access request to the newly designated feature server (block 662). Where this newly designated feature server acknowledges the network request (block 664), it proceeds to service the network service request. Otherwise the process for identifying a feature server to service the request is repeated (blocks 668, 670, 672).

Figure 6D:
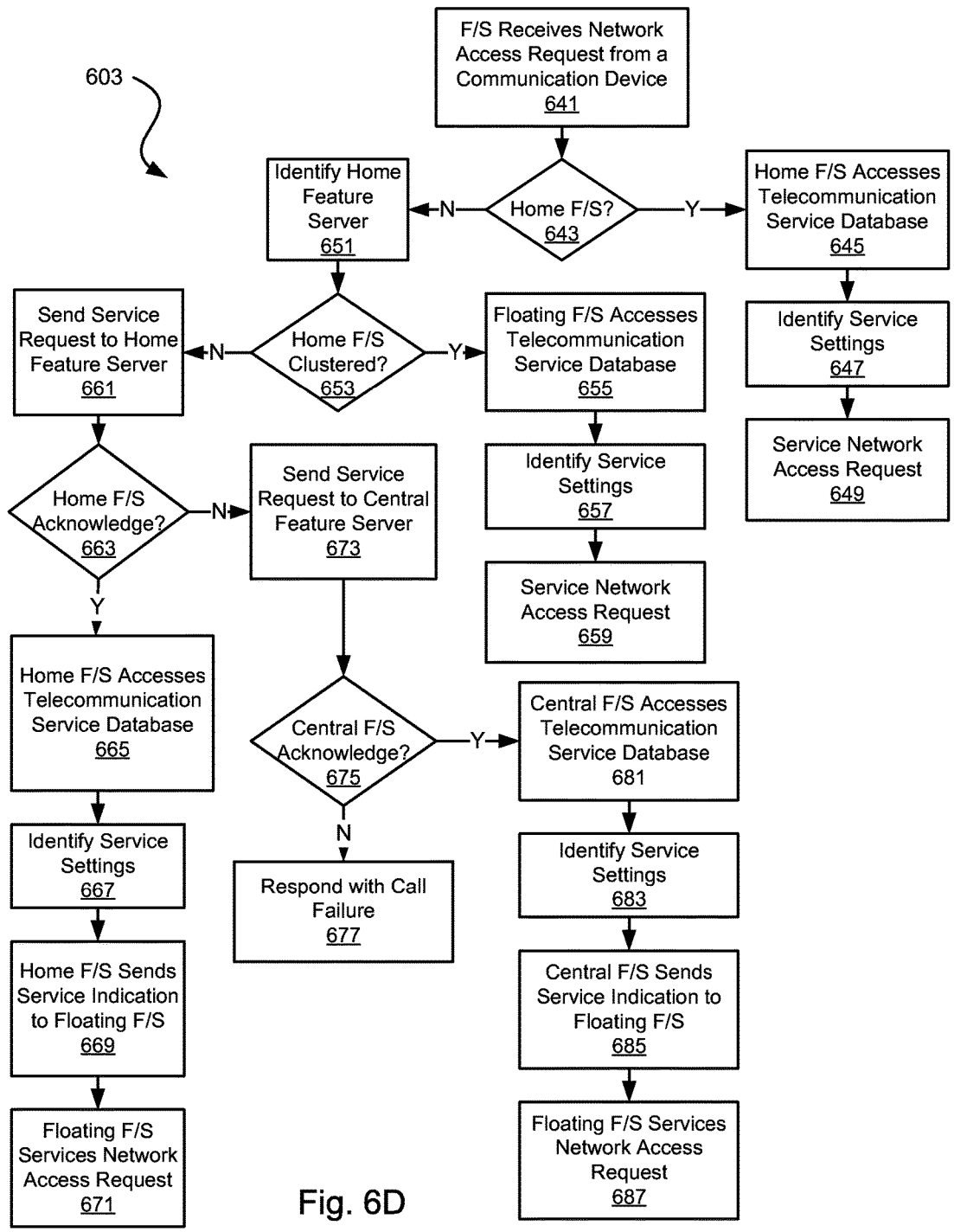

Turning to FIG. 6D, a flow diagram 603 shows a network access which, is in this case, a registration request from the perspective of the network servicing the call. Following flow diagram 603, a feature server receives a request to register a communication device (block 641). The receiving feature server determines whether it is the home feature server for the communication device initiating the request (block 643). Where the feature server is the home feature server (block 643), the feature server accesses the telecommunication service database associated with the feature server (block 645). By accessing the telecommunication service database (block 645), the feature server identifies service settings associated with the communication device (block 647). These service settings can indicate, among other things, the quality of service offered to the communication device and what services the communication device has authorized. The services can be, but are not limited to, voice mail, call forwarding, caller identification, multi-party calling, and/or the like. The feature server then proceeds to service the registration request (block 649).

Alternatively, where it is determined that the feature server is not the home feature server (block 643), the feature server identifies the home feature server for the communication device (block 651). In this case the receiving feature server is a floating feature server and will seek out information regarding the communication device from the home feature server of the communication device. In particular, the floating feature server determines whether it is clustered with the home feature server (block 653). Where the floating feature server is clustered with the home feature server (block 653), the floating feature server accesses the telecommunication service database associated with the cluster including the home feature server (block 655). By accessing the telecommunication service database (block 655), the floating feature server identifies service settings associated with the communication device (block 657). Using these service settings, the floating feature server proceeds to service the request (block 659).

Where it is determined that the floating feature server is not clustered with the home feature server (block 653), a service request is sent to the identified home feature server (block 661). This service request queries for service settings about the communication device from the home feature server. The floating feature server waits for some period to determine if the home feature server will acknowledge the service request (block 663). Where the home feature server acknowledges the service request (block 663), the home feature server accesses the telecommunication service database associated with the home feature server (block 665), and identifies service settings associated with the communication device (block 667). The home feature server sends the identified service settings to the requesting floating feature server (block 669). Based on the received service settings, the floating feature server proceeds to service the request (block 671).

Where the home feature server does not acknowledge the service request from the home feature server (block 663), the service request is sent to a central feature server (block 673). In general, a central feature server will offer only rudimentary service settings capable of fulfilling a basic call or other network access request. Thus, where the home feature server fails to respond, the communication device may still be offered some level of service, albeit not the entire package usually enjoyed by the communication device. The floating feature server waits for some period to determine if the central feature server will acknowledge the service request (block 675). Where the central feature server acknowledges the service request (block 675), the central feature server accesses the telecommunication service database associated with the central feature server (block 681), and identifies service settings associated with the communication device (block 683). The central feature server sends the identified service settings to the requesting floating feature server (block 685), and based on the received service settings, the floating feature server proceeds to service the request (block 687). Alternatively, where the central feature server fails to acknowledge the service request (block 675), the call request fails (block 677). Failure of the call request can be indicated to the communication device by, for example, providing a particular dial tone to the communication device, and/or sending an error message to the communication device.

Figure 7:
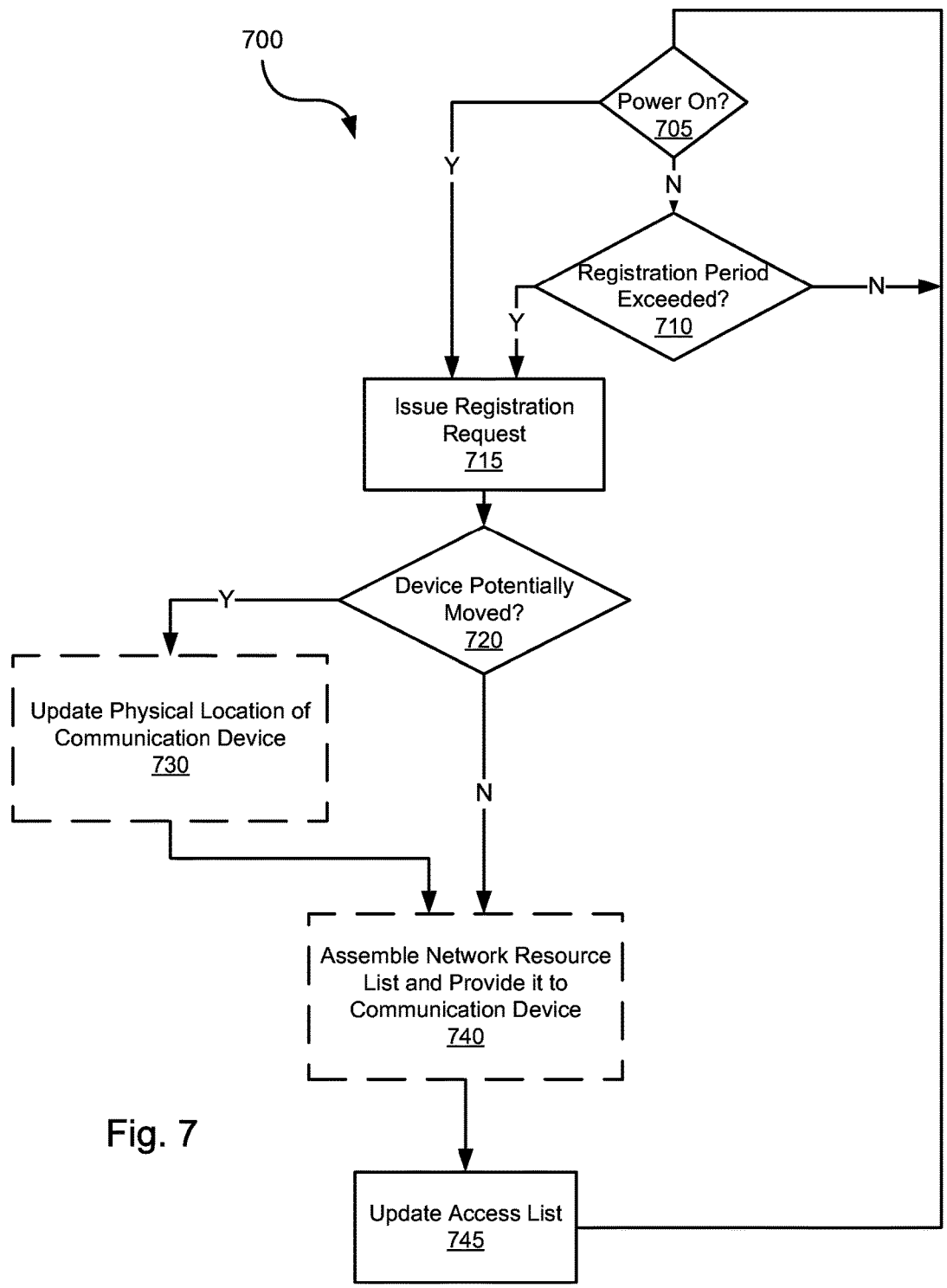
FIG. 7 is a flow diagram showing a method for identifying communication device location and dynamic registration of a communication device in accordance with various embodiments of the present invention.

Turning to FIG. 7, a flow diagram 700 shows a method for identifying communication device location and for dynamically registering a communication device in accordance with various embodiments of the present invention. Following flow diagram 700, it is determined if the communication device has recently powered on (block 705), or whether the registration period for the communication device has been exceeded (block 710). Where either of these conditions are met, the communication device issues a registration request to the network (block 715). It is then determined whether the communication device may have potentially moved since the last time it registered with the network (block 720). This can be done by determining whether the last network access by the communication device reported a different IP address for the communication device, or whether the communication device is accessing the network via a different load balancer than that used in a previous network access. These and other methods for determining the potential that a communication device has moved are more fully described in U.S. Pat. No. 8,768,350 entitled "Systems and Methods for Locating Endpoints in a Communication Network", and filed by Hagens et al; and U.S. Pat. No. 7,734,019 entitled "Systems and Methods for Third Party Emergency Call Termination", and filed by Terpstra. Each of the aforementioned patent applications were previously incorporated herein by reference in their entirety.

Where it is determined that the communication device either moved or potentially moved (block 720), the physical location of the communication device is updated (block 730). This physical location information can be used to, among other things, dispatch emergency services in the event an emergency call is placed using the communication device. The process of updating the physical location of the communication device and for utilizing the updated physical location information is more fully described in U.S. Pat. No. 8,768,350 entitled "Systems and Methods for Locating Endpoints in a Communication Network", and filed by Hagens et al; and U.S. Pat. No. 7,734,019 entitled "Systems and Methods for Third Party Emergency Call Termination", and filed by Terpstra. Again, the entirety of each of the aforementioned patent applications was previously incorporated herein by reference.

Where an update of the physical location of the communication device is either not warranted (block 720) or is completed (block 730), the communication device is dynamically registered with the network by assembling a network resource list and providing it to the communication device (bock 740). This can include one or more of the processes discussed above in relation to FIG. 6. An access list incorporating information for the network resource list is updated with the communication device (block 745).

In conclusion, the present invention provides novel systems, methods and arrangements for dynamically registering devices with a network. While detailed descriptions of one or more embodiments of the invention have been given above, various alternatives, modifications, and equivalents will be apparent to those skilled in the art without varying from the spirit of the invention. Therefore, the above description should not be taken as limiting the scope of the invention, which is defined by the appended claims.

What is claimed is:

1. A communication network comprising:
   a plurality of feature servers providing services to communication devices within the communication network, the plurality of feature servers including at least a first feature server;
   a plurality of registration redirect servers each servicing a shared virtual Internet Protocol (IP) address common to the plurality of registration redirect servers, each of the plurality of registration redirect servers performing load balancing of registration requests on behalf of two or more of the plurality of feature servers located geographically proximate to the registration redirect server; and
   a plurality of geographically dispersed communication devices communicatively coupled with the plurality of registration redirect servers, each of the plurality of geographically dispersed communication devices configured to issue initial registration requests intended for any of the plurality of feature servers to the shared virtual IP address, whereby upon issuing an initial registration request, a first communication device of the plurality of geographically dispersed communication devices is directed to the first feature server, the first feature server being selected by a load balancing routine executing on a first registration redirect server of the plurality of registration redirect servers;
   wherein the first feature server is further configured to:
      receive, from the first registration redirect server, the initial registration request;
      determine that the first communication device is associated with a home feature server that is different from the first feature server;
      notify the home feature server of the initial registration request for the first communication device;
      receive service settings for the first communication device; and
      provide requested services to the first communication device based on the service settings.

2. The communication network of claim 1, wherein the service settings are received by the first feature server from the home feature server.

3. The communication network of claim 1, wherein the service settings are received by the first feature server from a central feature server.

4. The communication network of claim 1, wherein the home feature server and the first feature server are clustered, and the service settings are retrieved by the first feature server from a database accessible to both the home feature server and the first feature server.

5. A method for dynamically provisioning feature server access in a communication network, comprising:

receiving, at a registration redirect server, a registration request for a first communication device connected to the communication network;

selecting a first feature server to which to redirect the registration request, wherein the selecting is performed by a load balancing routine executing on the registration redirect server;

receiving, at the first feature server and from the registration redirect server, the registration request for the first communication device connected to the communication network;

determining, by the first feature server, that the first communication device is associated with a home feature server;

notifying the home feature server of the registration request for the first communication device;

receiving, at the first feature server, service settings for the first communication device; and providing, by the first feature server, requested services to the first communication device based on the service settings.

6. The method of claim 5, further comprising:
when no response is received by the first feature server from the home feature server, obtaining the service settings from a central feature server.

7. The method of claim 6, further comprising:
waiting a predetermined amount of time for a response from the first feature server and, when no response from the first feature server is received in the predetermined amount of time, sending a request to the central feature server for the service settings.

8. The method of claim 5, further comprising:
determining whether the first feature server and the home feature server are clustered;
when the first feature server and the home feature server are clustered, retrieving the service settings from a database accessible to both the home feature server and the first feature server; and
when the first feature server and the home feature server are not clustered, retrieving the service settings from a central feature server.

9. The method of claim 5, wherein the first feature server receives the service settings from the home feature server.

10. The method of claim 5, wherein the registration request is addressed to a virtual Internet Protocol (IP) address shared by multiple registration redirection servers.

11. A system for dynamically provisioning feature server access in a communication network, comprising:
at least one processor;
memory, operatively connected to the at least one processor and storing instructions that, when executed by the at least one processor, cause the system to perform a method, the method comprising:
receiving, at a registration redirect server, a registration request for a first communication device connected to the communication network;

selecting a first feature server to which to redirect the registration request, wherein the selecting is performed by a load balancing routine executing on the registration redirect server;

receiving, at the first feature server and from the registration redirect server, the registration request for the first communication device connected to the communication network;

determining, by the first feature server, that the first communication device is associated with a home feature server;

notifying the home feature server of the registration request for the first communication device;

receiving, at the first feature server, service settings for the first communication device; and providing, by the first feature server, requested services to the first communication device based on the service settings.

12. The system of claim 11, wherein the method further comprises:
when no response is received by the first feature server from the home feature server, obtaining the service settings from a central feature server.

13. The system of claim 12, wherein the method further comprises:
waiting a predetermined amount of time for a response from the first feature server and, when no response from the first feature server is received in the predetermined amount of time, sending a request to the central feature server for the service settings.

14. The system of claim 11, wherein the method further comprises:
determining whether the first feature server and the home feature server are clustered;
when the first feature server and the home feature server are clustered, retrieving the service settings from a database accessible to both the home feature server and the first feature server; and
when the first feature server and the home feature server are not clustered, retrieving the service settings from a central feature server.

15. The system of claim 11, wherein the first feature server receives the service settings from the home feature server.

16. The system of claim 11, wherein the registration request is addressed to a virtual Internet Protocol (IP) address shared by multiple registration redirection servers.

* * * * *